(12) United States Patent
Zangi et al.

(10) Patent No.: US 6,608,862 B1
(45) Date of Patent: Aug. 19, 2003

(54) METHOD AND APPARATUS FOR COMPUTING PREFILTER COEFFICIENTS

(75) Inventors: Kambiz C. Zangi, Durham, NC (US); Dennis Hui, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/378,314

(22) Filed: Aug. 20, 1999

(51) Int. Cl.[7] ............................ H03H 7/30; H03H 7/40; H03H 5/159
(52) U.S. Cl. ...................... 375/232; 375/233; 708/323
(58) Field of Search .................. 375/232, 233, 375/234, 229, 350, 340; 708/322, 323, 319

(56) References Cited

U.S. PATENT DOCUMENTS

| | | | |
|---|---|---|---|
| 4,701,936 A | | 10/1987 | Hau et al. .................. 375/364 |
| 5,119,196 A | * | 6/1992 | Ayanoglu et al. ........... 348/614 |
| 5,533,063 A | * | 7/1996 | Mitra et al. ................ 375/340 |
| 6,115,418 A | * | 9/2000 | Raghavan ................... 375/233 |

FOREIGN PATENT DOCUMENTS

| | | | |
|---|---|---|---|
| FR | 2783120 | 3/2000 | ............ H04L/27/01 |
| WO | 9739550 | 10/1997 | ............. H04L/1/00 |

OTHER PUBLICATIONS

Comparison of Algorithms for Use in Adaptive Adjustment of Digital Data Receivers, *Abstract IEE Proceedings I*, vol. 137, No. 2, Part 1, published Apr., 1990.

Joint Equalization and Interference Suppression for High Data Rate Wireless Systems, *Abstract IEEE Proceedings I*, vol. 137, No. 2, Part 1, published Apr., 1960.

\* cited by examiner

*Primary Examiner*—Phuong Phu
(74) *Attorney, Agent, or Firm*—Moore & Van Allen PLLC

(57) ABSTRACT

The impulse response of a prefilter used with a DFSE equalizer in a receiver system is computed. A channel estimate is determined in response to signals received by the receiver system. The channel estimate may include a forward channel estimate and a backward channel estimate. Roots of a z-transform of the forward channel estimate and roots of a z-transform of the backward channel estimate are determined. Those roots of the z-transform of the forward channel estimate having a magnitude greater than one are used to form a z-transform of a forward impulse response of the prefilter while those roots of the z-transform of the backward channel estimate having a magnitude greater than one are used to form a z-transform of a backward impulse response of the prefilter. Forward prefilter coefficients for the prefilter are computed based on the z-transform of the forward impulse response of the prefilter and backward prefilter coefficients for the prefilter are computed based on the z-transform of the backward impulse response of the prefilter. A forward impulse response of a forward composite channel are computed based on the forward prefilter coefficients while a backward impulse response of a backward composite channel are computed based on the backward prefilter coefficients.

49 Claims, 5 Drawing Sheets

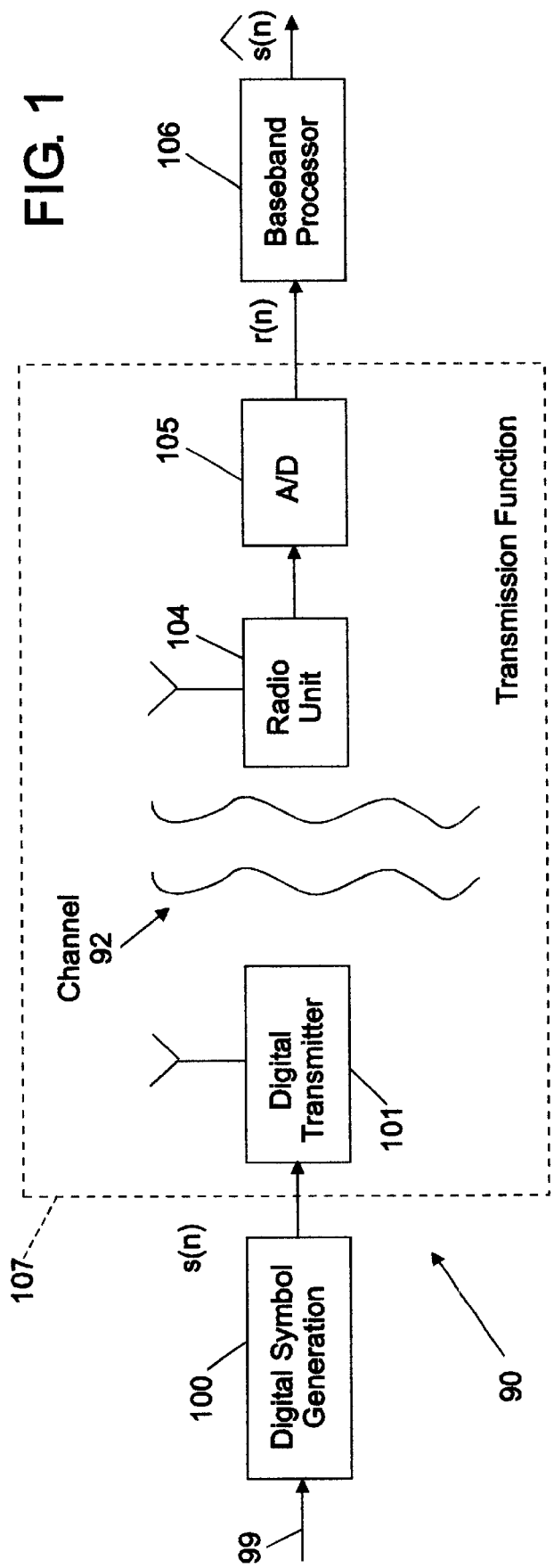
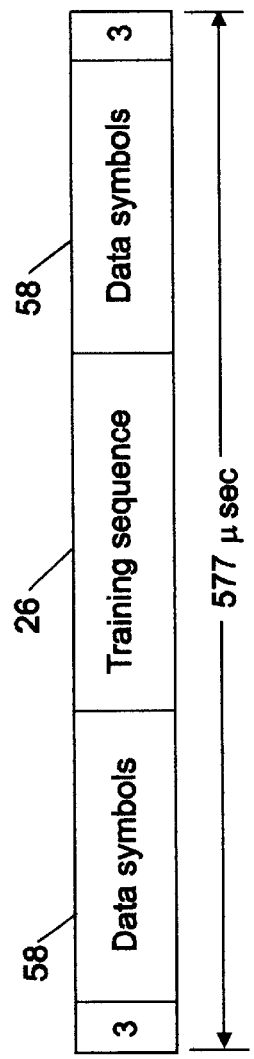

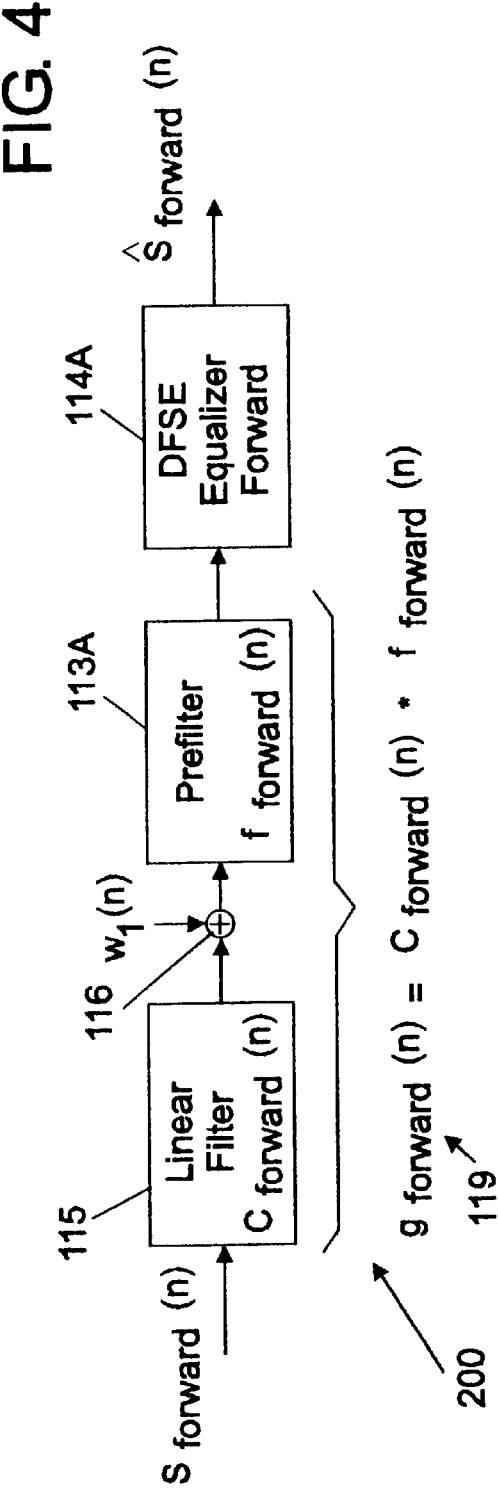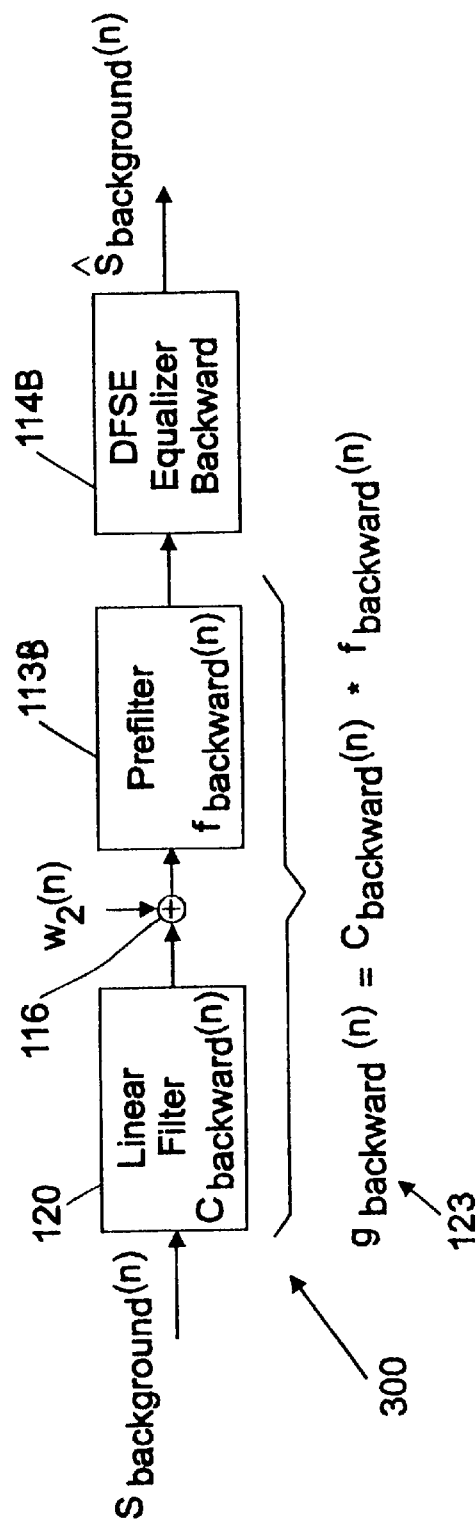

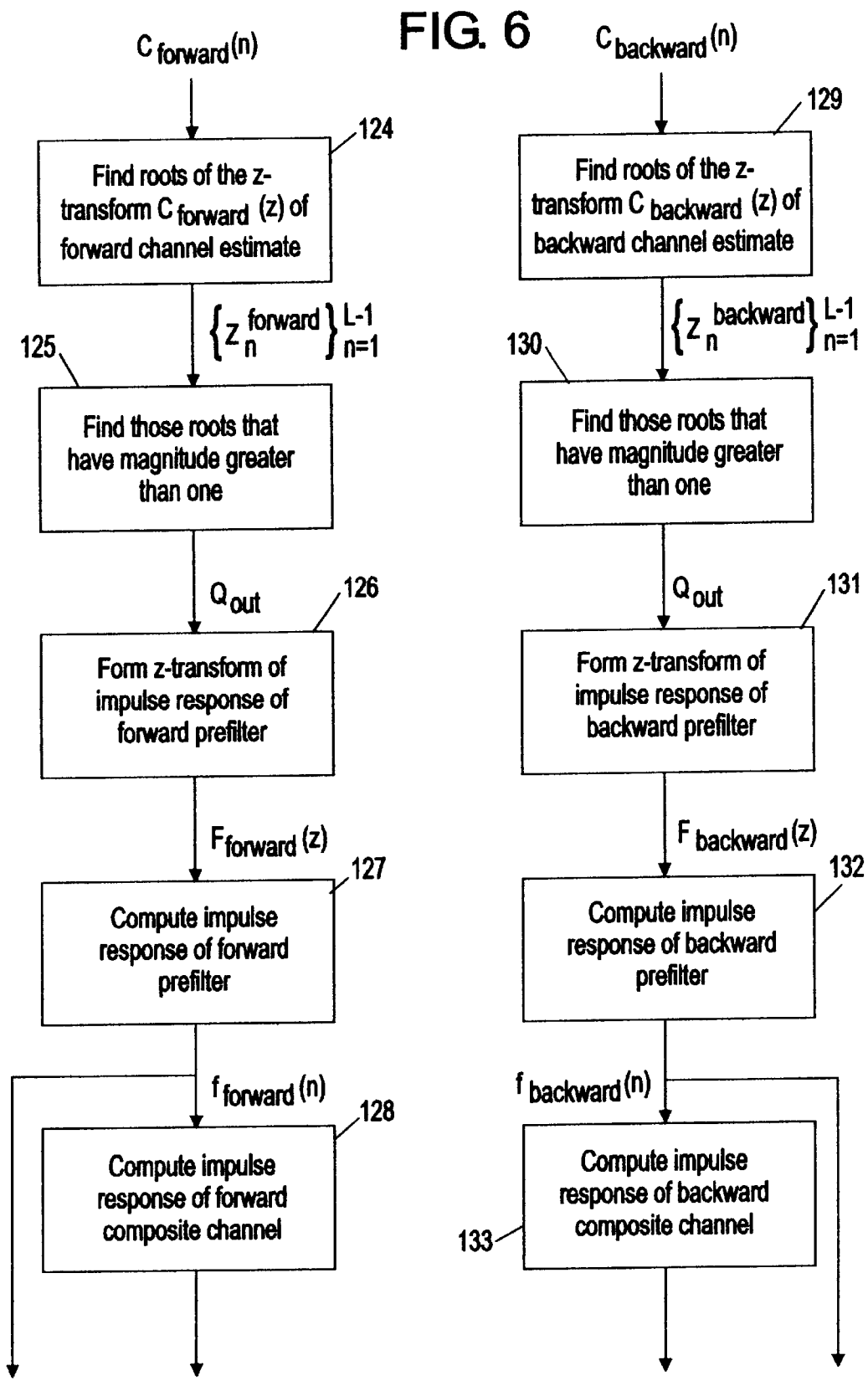

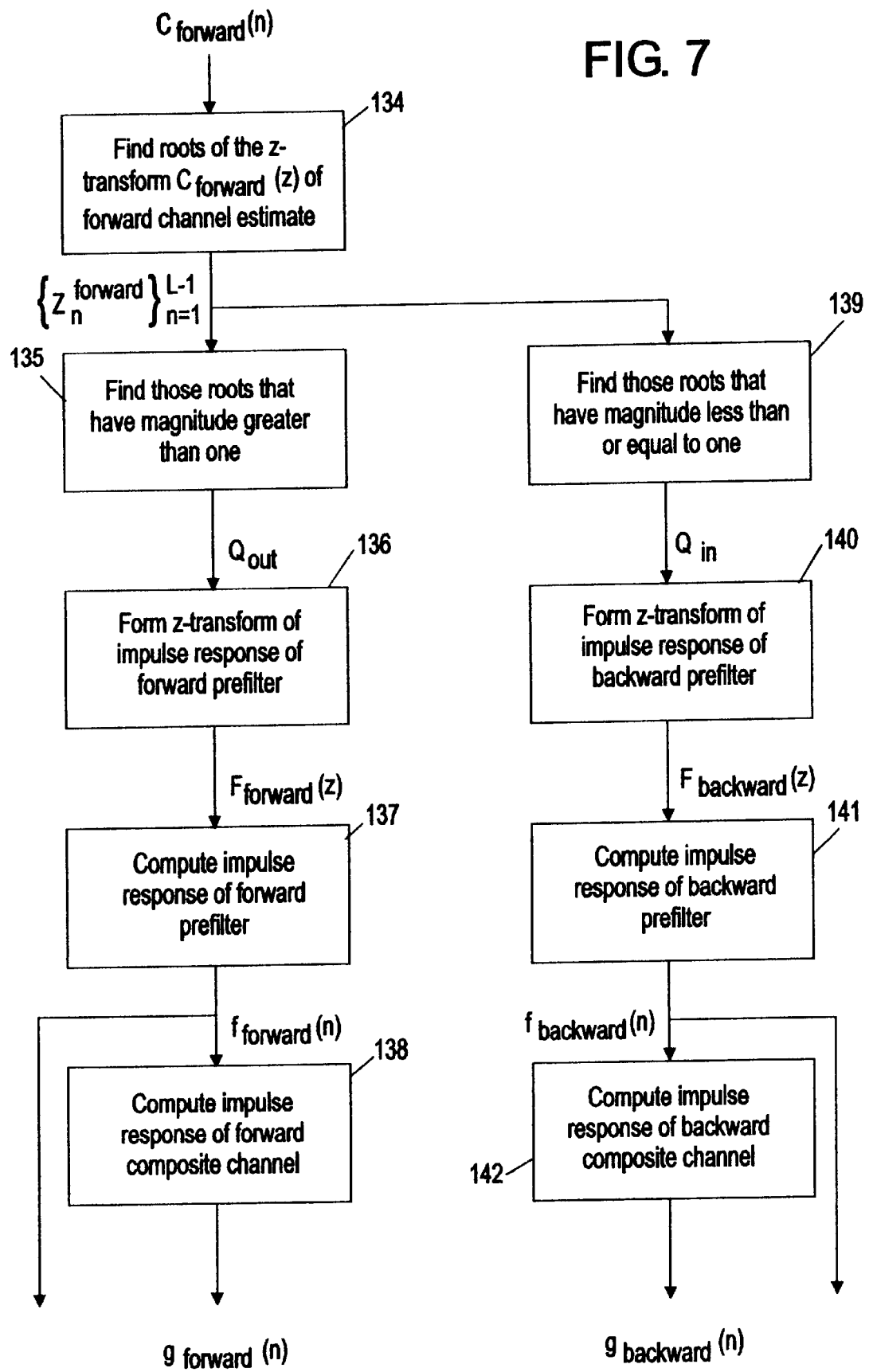

METHOD AND APPARATUS FOR COMPUTING PREFILTER COEFFICIENTS

BACKGROUND OF THE INVENTION

This invention relates in general to digital communication systems that include a digital prefilter in conjunction with a Decision Feedback Sequence Estimation (DFSE) equalizer, and more particularly, to a system and method for computing the coefficients of such a prefilter.

Digital wireless communication systems require equalization to compensate for intersymbol interference (ISI) resulting from time dispersion or delay spread in the channel. Typically, a non-linear equalizer, such as a Maximum Likelihood Sequence Estimation (MLSE) equalizer, is used to provide coherent demodulation, and thus, compensation for ISI, in such digital wireless communication systems. However, while a MLSE equalizer performs adequately, it is complex to implement.

Other equalizers have also been used to provide compensation for ISI. For example, a Decision Feedback Sequence Estimation (DFSE) equalizer has been used in place of the MLSE equalizer. While the complexity of implementing the DFSE equalizer can be substantially lower than the complexity of implementing the MLSE equalizer, the DFSE equalizer alone provides suboptimal results compared to the MLSE equalizer.

A finite impulse response (FIR) prefilter may be used with the DFSE equalizer to improve performance. The impulse response of the prefilter is determined by coefficients that are calculated by complex mathematical equations. While a DFSE equalizer with a prefilter can perform very close to the MLSE equalizer, the complexity of the mathematical equations to determine the coefficients of the prefilter can offset the complexity savings afforded by the DFSE equalizer.

In some communication systems the receiver operates on a burst-by-burst basis, i.e. the receiver first collects a burst of received samples, and then starts processing this collected burst. In this type of system, the receiver typically equalizes part of the burst "forward in time" and it equalizes the other part of the burst "backward in time." Two different prefilters must then be used, one for forward equalization and one for backward equalization. Multiple prefilters along with the corresponding impulse response calculations reduce the complexity savings afforded by the DFSE equalizer.

The DFSE equalizer will now be explained. The DFSE equalizer can be best explained as an approximation of a well-known MLSE equalizer. The MLSE equalizer considers various hypotheses for the transmitted symbol sequence, and with a model of the dispersive channel, determines which hypothesis best fits the received samples. This is efficiently realized using the Viberbi algorithm. This equalization technique is well known to those skilled in the art, and can be found in J. C. Proakis, *Digital Communication*, McGraw-Hill (1989).

The conventional MLSE equalizer can be explained by a simple example. Suppose the transmitter transmits a symbol stream s(n), which takes on values "+1" or "−1" corresponding to bit values 0 or 1 respectively. This stream is modulated using binary-shift keying (BPSK). At the receiver, the received signal is filtered, amplified, and mixed down using I and Q carriers, then sampled once every symbol period (T), giving a received signal stream r(n). In this example, an intervening channel consists of three rays, a main ray and two echoes, where the first echo arrives T second later, and the second echo arrives 2T seconds later. The received signal at baseband can then be modeled as:

$$r(n) = c_0 s(n) + c_1 s(n-1) + c_2 s(n-2) + \eta(n) \quad (1)$$

where $c_0$, $c_1$ and $c_2$ are complex channel tap values, and $\eta(n)$ is additive noise or interference.

In the MLSE equalizer, at iteration n, there are four different previous "states" (0, 1, 2, and 3), corresponding to the four possible values for the two most recent previous symbols:

1. (s(n−1)=−1, s(n−2)=−1) ⇒ Previous State=0
2. (s(n−1)=−1, s(n−2)=+1) ⇒ Previous State=1
3. (s(n−1)=+1, s(n−2)=−1) ⇒ Previous State=2
4. (s(n−1)=+1, s(n−2)=+1) ⇒ Previous State=3.

Associated with each previous state there is an accumulated metric, accumulated from previous iterations, giving rise to accumulated metrics:

$(A_0(n-1), A_1(n-1), A_2(n-1), A_3(n-1))$.

There are also four current states corresponding to four possible values for the 2-tuple [s(n), s(n−1)]. Each possible paring of a previous state with a current state corresponds to a hypothetical 3-tuple sequence $[s_h(n), s_h(n-1), s_h(n-2)]$. For each of these hypotheses, there is a corresponding hypothesized received signal value at time n:

$$r_h(n) = c_0 s_h(n) + c_1 s_h(n-1) + c_2 s_h(n-2). \quad (2)$$

Furthermore, for each of these hypothesis, there is a corresponding "branch" metric given by:

$$M_h(n) = |r(n) - r_h(n)|^2 \quad (3)$$

$$= \left| r(n) - \sum_{k=0}^{2} c_k s_h(n-k) \right|^2. \quad (4)$$

In this example, there are eight possible hypothetical sequences, corresponding to eight different pairings of a previous state and a current state.

In an MLSE equalizer for each "n", eight branch metrics must be computed according to equation (4). There is one branch metric corresponding to each possible value of the 3-tuple $[s_h(n), s_h(n-1), s_h(n-2)]$. Since each element of this 3-tuple has two possible values, there are $8 = 2^3$ possible 3-tuples.

The DFSE equalizer can be best explained by continuing the above example with three channel taps ($c_0$, $c_1$, $c_2$). In a DFSE equalizer, the three channel taps are usually divided into two parts: an MLSE part consisting of the first few-taps (e.g. $c_0$ and $c_1$), and a DFE part consisting of the other trailing taps (e.g. $c_2$). Next, a trellis corresponding only to the MLSE taps (in this example the state will have just one element) is constructed. The branch metric of the DFSE equalizer at time n is:

$$dM_h(n) = |r(n) - c_0 s_h(n) - c_1 s_h(n-1) - c_2 \bar{s}(n-2)|^2 \quad (5)$$

where $[s_h(n), s_h(n-1)]$ come from the hypothesized paring of the previous state and the current state, but $\bar{s}(n-2)$ denotes the decided symbol obtained from the path history of the previously hypothesized state.

Comparing the branch metric of the DFSE (equation (5)) to the branch metric of the MLSE (equation (4)), the MLSE equalizer at time n hypothesizes all possible values of the 3-tuple $[s_h(n), s_h(n-1), s_h(n-2)]$, while the DFSE equalizer. at time n only hypothesizes all the possible values of the 2-tuple $[s_h(n), s_h(n-1)]$. Hence, the MLSE equalizer computes eight-branch metrics for each n, while the DFSE equalizer computes only four-branch metrics for each n. The DFSE equalizer is approximately one half the complexity of the MLSE equalizer in this example. Correspondingly, the performance of the DFSE equalizer is also less than the MLSE equalizer.

In this example, for the performance of the DFSE equalizer to be close to the performance of the MLSE equalizer, it is desirable to make $|c_2|^2$ as small as possible. If $c_2=0$, then the DFSE equalizer is equivalent to the MLSE equalizer. More generally, if the intervening channel has coefficients $$\{c_i\}_{i=0}^{L_c-1},$$

then the DFSE equalizer partitions these $L_c$ coefficients into two parts: the MLSE part consisting of the leading $L_{MLSE}$ coefficients (i.e.

$$(\text{i.e. } \{c_i\}_{i=0}^{L_{MLSE}-1}),$$

and the DFE part consisting of the trailing coefficients (i.e.

$$(\text{i.e. } \{c_i\}_{i=L_{MLSE}}^{L_c-1}).$$

The resulting branch metric for time n for the DFSE equalizer is:

$$dM_h(n) = \left| r(n) - \sum_{k=0}^{L_{MLSE}-1} c_k s_h(n-k) - \sum_{k=L_{MLSE}}^{L_c-1} c_k \tilde{s}_h(n-k) \right|^2. \quad (6)$$

Since only $$\{c_i\}_{i=0}^{L_{MLSE}-1}$$

are hypothesized, the number of possible branch metrics that need to be computed for each n is only $2^{L_{MLSE}}$ for the DFSE equalizer but $2^{L_c}$ for the MLSE equalizer.

In a typical implementation of the DFSE equalizer, the received signal, $r(n)$, is first passed through a FIR prefilter having an impulse response $$\{f(n)\}_{n=0}^{L_f-1}.$$

A composite baseband channel which is the channel now seen by the DFSE equalizer is expressed as $g(n)=c(n)*f(n)$. A signal $r'(n)$ representing the received signal after passing through the prefilter can be expressed in terms of the transmitted symbols, $s(n)$'s, according to:

$$r'(n) = \sum_{k=0}^{L_h-1} s(n-k)g(k) + v(n), \quad (7)$$

where $v(n)=w_1(n)*f(n)$. The DFSE equalizer then operates on $r'(n)$, and the intervening channel seen by the DFSE equalizer is now $$\{g(n)\}_{n=0}^{L_h-1}.$$

The goal in computing the prefilter $f(n)$ is to get a composite channel, $g(k)$'s, such that the trailing taps $$(\{g(n)\}_{n=L_{MLSE}}^{L_h-1}$$

are the trailing taps of $g(k)$) are as small as possible. For the DFSE to perform well, it is also desirable that $|F(\omega)|$ (i.e. the magnitude of the Fourier transform of the prefilter $f(n)$) be constant for all frequencies $\omega$ (i.e. we would like $|F(\omega)|\approx 1$ for all $\omega$).

One method for computing the impulse response of the prefilter $f(n)$ for the DFSE is disclosed by S. Ariyavisitakul, J. H. Winters, N. R. Sollenberger, Joint Equalization and Interference Suppression for High Data Rate Wireless Systems, Proceedings of IEEE Vehicular Technology Conference, Houston, 1999. The method involves solving a system of $L_f$ linear equations (where $L_f$ is the length of the FIR prefilter $f(n)$). Solving this system of equations requires approximately $2 \times L_f^3$ operations. For each burst of the received samples, the coefficients for two such prefilters need to be computed (one for equalizing "forward in time" and another for equalizing "backward in time"). In summary, this method requires approximately $4 \times L_f^3$ operations.

Accordingly, there is a need for a receiver system and method that provides a low complexity mechanism for computing the impulse response (i.e. coefficients) of the prefilter used in the DFSE equalizer. There is a further need for such a receiver system and method that avoids performing two prefilter computations per burst (one computation for the "forward equalization", and one computation for the "backward equalization").

SUMMARY OF THE INVENTION

The present inventions meets these needs by providing a receiver system having a prefilter and a DFSE equalizer in which the impulse response of the prefilter is computed relatively easily. A channel estimate is determined in response to signals received by the receiver system. The channel estimate may include a forward channel estimate and a backward channel estimate. Roots of a z-transform of the forward channel estimate and roots of a z-transform of the backward channel estimate are determined. Those roots of the z-transform of the forward channel estimate having a magnitude greater than one are used to form a z-transform of a forward impulse response of the prefilter while those roots of the z-transform of the backward channel estimate having a magnitude greater than one are used to form a z-transform of a backward impulse response of the prefilter. Forward prefilter coefficients for the prefilter are computed based on the z-transform of the forward impulse response of the prefilter and backward prefilter coefficients for the prefilter are computed based on the z-transform of the backward impulse response of the prefilter. A forward impulse response of a forward composite channel are computed based on the forward prefilter coefficients while a backward impulse response of a backward composite channel are computed based on the backward prefilter coefficients.

According to a first aspect of the present invention, a method of computing a prefilter comprises estimating a channel estimate of a signal received by a receiver. Roots of a z-transform of the channel estimate are determined. A z-transform of an impulse response of the prefilter is formed based on the roots of the z-transform of the channel estimate. Prefilter coefficients of the prefilter are computed based on the z-transform of the impulse response of the prefilter.

According to another aspect of the present invention, a method of computing a prefilter comprises estimating a forward channel estimate and a backward channel estimate of a signal received by a receiver. Roots of a z-transform of the forward channel estimate are determined. Roots of a z-transform of the backward channel estimate are determined. A z-transform of a forward impulse response of the prefilter is formed based on the roots of the z-transform of the forward channel estimate. A z-transform of a backward impulse response of the prefilter is formed based on the roots of the z-transform of the backward channel estimate. Forward prefilter coefficients of the prefilter are formed based on the z-transform of the forward impulse response of the prefilter. Backward prefilter coefficients of the prefilter are computed based on the z-transform of the backward impulse response of said prefilter.

According to yet another aspect of the present invention, a method of computing a prefilter comprises estimating a channel estimate of a signal received by a receiver. Roots of a z-transform of the channel estimate are determined. A z-transform of a forward impulse response of the prefilter is formed based on the roots of the z-transform of the channel estimate having a magnitude greater than one. A z-transform of a backward impulse response of the prefilter is formed based on the roots of the z-transform of the channel estimate having a magnitude less than or equal to one. Forward prefilter coefficients of the prefilter are computed based on the z-transform of the forward impulse response of the prefilter. Backward prefilter coefficients of the prefilter are computed based on the z-transform of the backward impulse response of the prefilter.

The present invention provides a low complexity mechanism for computing the impulse response (i.e. coefficients) of the prefilter used in the DFSE equalizer. The receiver and method for computing the impulse response of the prefilter avoids the need to perform two prefilter computations per burst (one computation for the "forward equalization", and one computation for the "backward equalization"). Other features and advantages of the invention will be apparent from the following description, the accompanying drawings and the appended claims.

BRIEF DESCRIPTION OF THE DRAWINGS

FIG. 1 illustrates a wireless communication system according to the present invention;

FIG. 2 illustrates a GSM burst structure used with the wireless communication system of FIG. 1;

FIG. 4 illustrates a composite channel model in a forward direction of a DFSE Equalizer of the baseband processor of FIG. 3;

FIG. 5 illustrates a composite channel model in a backward direction of the DFSE Equalizer of the baseband processor of FIG. 3;

FIG. 6 is a flowchart illustrating the computation of prefilter coefficients in the forward and backward directions for a prefilter of the baseband processor of FIG. 3 according to a first aspect of the present invention; and FIG. 7 is a flowchart illustrating the computation of prefilter coefficients in the forward and backward directions for the prefilter of the baseband processor of FIG. 3 according to a second aspect of the present invention.

DETAILED DESCRIPTION OF THE INVENTION

Figure 3:
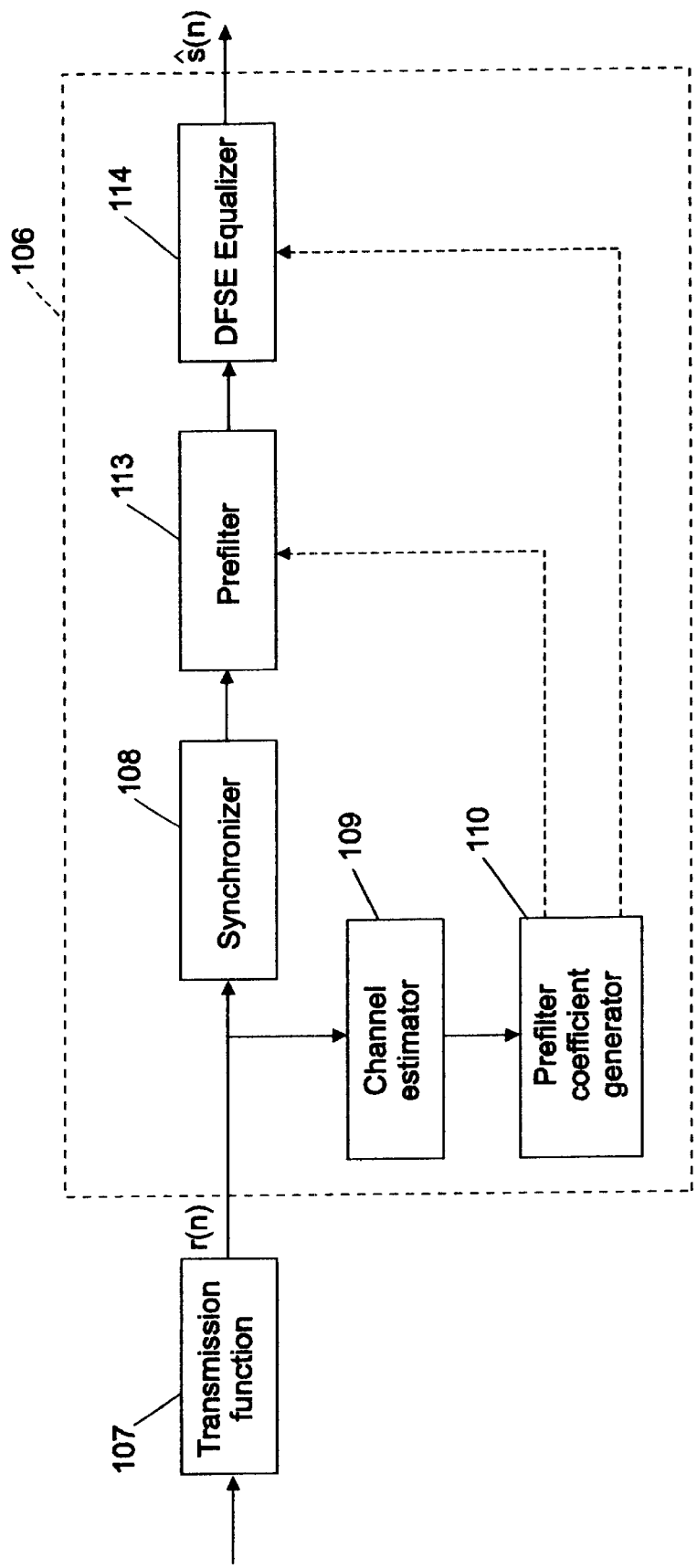
FIG. 3 illustrates a baseband processor of the wireless communication system of FIG. 1.

The present invention is a method for computing the impulse response of a prefilter in a digital communication receiver, which requires smaller amount of computations than that required by the conventional method. This invention can be used in receivers of any radio communication systems, such as the Global System for Mobile Communication (GSM) or the Enhanced Data rates for Global Evolution (EDGE), to improve the performance of equalization at baseband. For illustrative purposes, the following description is directed to the GSM systems and to a communication receiver that uses a DFSE equalizer. However, it will be appreciated by those skilled in the art that the invention is not so limited and applies to other systems, such as IS-136, and to receivers with other types of equalizers as well.

Referring to FIG. 1, a block diagram of a hardware implementation of a radio communication system 90 is illustrated. The radio communication system 90 comprises a line 99, a digital symbol generator 100, a digital transmitter 101, a transmitting antenna 102, a receiving antenna 103, a radio unit 104, an analog-to-digital (AND) converter 105 and a baseband processor 106. Voice or data information to be transmitted is delivered on line 99 to the digital symbol generator 100. The symbol generator 100 develops transmitted symbols s(n) based on the received information signal from line 99. The transmitted symbols s(n) are then supplied to the digital transmitter 101. The transmitter 101 transmits radio signals containing information about s(n) via the transmitting antenna 102 through a channel medium 92. The radio signals are received by the receiving antenna 103 of the radio unit 104. The radio unit 104 filters and amplifies the received signals and converts them to a suitable form for processing. The received signals may be represented as analog samples that are provided to the A/D converter 105, whose outputs are digital samples suitable for processing by the baseband processor 106. The baseband processor 106 processes the digital samples from the A/D converter 105 and produces estimated symbols ŝ(n). The transmitter 101, the channel 92, the radio unit 104, and the A/D converter 105 will be referred to as a transmission function 107 hereinafter. The baseband processor 106 along with the receiving antenna 103, the radio unit 104 and the AND converter 105 form a receiver.

In most communication systems, the transmitted symbols s(n) are grouped into blocks or bursts, each containing many unknown symbols and a few known symbols. Specifically, in the GSM systems, each burst consists of 148 symbols, with each symbol containing one bit of information. As shown in FIG. 2, each burst has time duration of 577 μsec and contains a training sequence of 26 symbols and 3 tail symbols at either end of the burst. The tail symbols are both known a priori at the receiver. Each burst carries 58 data symbols at either side of the training sequence. The goal of an equalizer in a receiver is to detect these data symbols with as low error rate as possible. To obtain a good initial start, an equalizer typically starts detection from the data symbols right beside the training sequence and going towards each end of the burst. In other words, an equalizer would typically be detecting the 58 data symbols on the left side of the training symbols in the backward direction and then detecting the 58 data symbols on the right side in the forward direction. Hereinafter, we will refer to the concatenation of the 3 tails symbols on the left side, the first 58 data symbols from the left side, and the 26 training symbols as the first half burst. Similarly, the concatenation of the 26 training symbols, the second 58 data symbols from the left side, and the 3 tails symbols on the right side as the second half burst.

Referring now to FIG. 3, a detailed block diagram of the baseband processor 106 is illustrated. The baseband processor 106 comprises a synchronizer 108, a channel estimator 109, a prefilter coefficient generator 110, a prefilter 113 and a DFSE equalizer 114. The digital samples from the transmission function 107 are transmitted to the synchronizer 108 and the channel estimators 109. The synchronizer 108 is configured to identify the position of the training sequence, and thus the relative positions of the data symbols, of each burst contained in the received samples. The synchronizer 108 produces bursts of symbols in the format depicted in FIG. 2.

The channel estimator 109 is configured to model the digital symbols from the transmission function 107 in conjunction with the synchronizer 108 as a linear filter with a finite impulse response. The channel estimator 109 develops a channel estimate c(n) of the impulse response of such a filter. The prefilter coefficient generator 110 receives the channel estimate c(n) and computes impulse responses of a desired prefilter and the impulse responses of corresponding composite channels, which will be defined later. The prefilter 113 receives bursts of symbols from the synchronization block 108 and performs linear filtering on the bursts based on the impulse responses received by the prefilter coefficient generator 110. The output of the prefilter 113 is transmitted to the DFSE equalizer 114. The DFSE equalizer detects the transmitted data symbols contained in each burst from the prefilter 113, based on the impulse responses of the composite channels received from the prefilter coefficient generator 110.

As described above, in a communication system like the GSM system where the training symbols are located in the middle of a burst, the data symbols in each half burst are typically detected by the DFSE equalizer 114 in either the forward direction or the backward direction. Forward and backward equalization will be described based on the models illustrated in FIGS. 4 and 5, respectively. It will be appreciated by those skilled in the art that the block diagrams illustrated in FIGS. 4 and 5 are for illustrative purposes only and do not necessarily represent the components illustrated in FIG. 3 per se.

Referring now to FIG. 4, a forward equalization model 200 is represented by a forward linear filter 115, an adder 116, a forward prefilter 113A and a forward DFSE equalizer 114A. Similarly, referring now to FIG. 5, a backward equalization model 300 is represented by a backward linear filter 120, the adder 116, a backward prefilter 113B and a backward DFSE equalizer 114B. When performing equalization in the forward direction as illustrated in FIG. 4, the transmission function 107 in conjunction with the synchronizer 108 can be modeled by the linear filter 115 with a finite impulse response $c_{forward}(n)$, (followed by an addition of a white noise signal $w_1(n)$ via the adder 116. Similarly, when performing equalization in the backward direction as illustrated in FIG. 5, the combination of the transmission function 107 and the synchronization block 108 can be modeled by the linear filter 120 with impulse response $c_{backward}(n)$ followed by an addition of a white noise signal $w_2(n)$ via the adder 116.

The corresponding inputs to the forward linear filter 115 and to the backward linear filter 120 are denoted by $s_{forward}(n)$ and $s_{backward}(n)$, respectively, which are derived from the transmitted symbols s(n). The finite impulse response $c_{forward}(n)$ of the linear filter 115, hereinafter referred to as the forward channel response, is equal to the channel estimate c(n) generated by the channel estimator 109. The finite impulse response $c_{backward}(n)$ of the linear prefilter 120, hereinafter referred to as the backward channel response, is related to the forward channel response $c_{forward}(n)$ by changing the order of time indices. More precisely, let $c_{forward}(n)$, n=0,1,2,... L−1, denote the impulse response in the forward direction, where L denotes the length of the impulse response. The backward channel response is then represented by:

$$c_{backward}(n) = c_{forward}(L-1-n). \quad (10)$$

In other words, the first tap of the backward channel response is equal to the last tap of the forward channel response, the second tap of the backward channel response is equal to the second to last tap of the forward channel response, and so on.

The operations performed on the first half burst and the second half burst by the prefilter 113 in FIG. 3 are separated into the backward prefilter 113A in FIG. 5 and the forward prefilter 113B in FIG. 4, respectively. It will be appreciated by those skilled in the art that the forward and backward prefilters 113A, 113B are actually the same prefilter with different impulse responses. Specifically, the impulse response of the forward prefilter 113A is $f_{forward}(n)$ and the impulse response of the backward prefilter 113B is $f_{backward}(n)$. Both $f_{forward}(n)$ and $f_{backward}(n)$ are generated by the prefilter coefficient generator 110, and together establish the output of the prefilter coefficient generator 110 in FIG. 3 received by the prefilter 113.

Similarly, the operations performed on the first half burst and the second half burst by the DFSE equalizer 114 in FIG. 3 are modeled by the backward DFSE equalizer 114B in FIG. 5 and the forward DFSE equalizer 114A in FIG. 4. Two different impulse responses, $g_{forward}(n)$ and $g_{backward}(n)$, are needed for the forward DFSE equalizer 114A and the backward DFSE equalizer 114B. The forward impulse response $g_{forward}(n)$ is equal to the convolution of $c_{forward}(n)$ and $f_{forward}(n)$, while the backward impulse response $g_{backward}(n)$ is equal to the convolution of $c_{backward}(n)$ and $f_{backward}(n)$. Both $g_{forward}(n)$ and $g_{backward}(n)$ are generated by the prefilter coefficient generator 110, and together they establish the output of the prefilter coefficient generator 110 in FIG. 3 received by the DFSE equalizer 114.

Referring to FIG. 4, the effective channel model from the perspective of the forward DFSE equalizer 114A is the composite channel 119, which has the impulse response $g_{forward}(n)$. Similarly, referring to FIG. 5, the effective channel model from the perspective of the backward DFSE equalizer 114B is the composite channel 123, which has the impulse response $g_{backward}(n)$.

Implementing the prefilter coefficient generator 110 in FIG. 3 will now be described. It is desirable to compute $f_{forward}(n)$ so as to maximize $$\sum_{k=0}^{L_{MLSE}} |g_{forward}(k)|^2 \quad (11)$$

and to compute $f_{backward}(n)$ so as to maximize $$\sum_{k=0}^{L_{MLSE}} |g_{backward}(k)|^2. \quad (12)$$

Equations 11 and 12 are constrained as both $f_{forward}(n)$ and $f_{backward}(n)$ have constant magnitudes in their corresponding Fourier transforms, where $L_{MLSE}$ is the number of MLSE taps. The reason for the constant magnitudes is that the prefilters 113A and 113B would have otherwise colored the frequency spectrum of the additive noise $w_1(n)$ and $w_2(n)$, which often has an adverse effect on the performance of the equalizer. It has been shown that the solution to the maximization problem described in equations 11 or 12, is to make the composite channel $g_{forward}(n)$, and respectively $g_{backward}(n)$ to be a minimum-phase impulse response, i.e. all the roots of the z-transform $$G_{forward}(z) = \sum_{n=0}^{L-1} g_{forward}(n)z^{-n} \qquad (13)$$

of $g_{forward}(n)$, and respectively $$G_{backward}(z) = \sum_{n=0}^{L-1} g_{backward}(n)z^{-n} \qquad (14)$$

of $g_{backward}(n)$, must have magnitudes less than or equal to one. See A. V. Oppenheim and R. W. Schafer, *Discrete-Time Signal Processing*, McGraw-Hill, 1989.

In accordance with one aspect of the present invention, a flow chart is shown in FIG. 6 summarizing the steps involved in computing $f_{forward}(n)$ and $f_{backward}(n)$ that lead to minimum-phase impulse response of the composite channel $g_{forward}(n)$ and $g_{backward}(n)$. The steps involved in computing $f_{forward}(n)$ will be described first, and the corresponding steps involved in computing $f_{backward}(n)$ follows in a similar manner. In block 124, the roots, denoted by $$\{z_n^{forward}\}_{n=1}^{L-1},$$

of the z-transform of the forward channel estimate $c_{forward}(n)$ are computed as follows:

$$C_{forward}(z) = \sum_{k=0}^{L-1} c_{forward}(n)z^{-n}. \qquad (15)$$

It will be appreciated by those skilled in the art that there are many well-known numerical methods for solving the roots of equation 15, such as the Newton-Raphson method and the Laguerre's method. In fact, when the number of taps L of the channel estimate $c_{forward}(n)$ is less than or equal to 5, there exist closed-form expressions for the roots of equation 15 in terms of the forward channel estimate $c_{forward}(n)$. In block 125, the subset $Q_{out}$ of all the roots in $\{z_n^{forward}\}_{n=1}^{L-1}$ which have magnitudes greater than one is determined. This step can be accomplished by checking whether the quantity $z_n^{forward} \cdot (z_n^{forward})^*$ is greater than one for each $n=1,2,\ldots,L-1$, where denotes the complex conjugate. In block 126, the z-transform $F_{forward}(z)$ of the forward impulse response $f_{forward}(n)$ of the forward prefilter 113A is calculated using the following formula:

$$F_{forward}(z) = \frac{\prod_{z_i \in Q_{out}} (1 - z_i^* z)}{\prod_{z_i \in Q_{out}} (-z_i + z)}. \qquad (16)$$

In block 127, the forward impulse response or forward prefilter coefficients $f_{forward}(n)$ from the z-transform $F_{forward}(z)$ described in equation 16 is calculated. It will be appreciated by those skilled in the art that various methods may be used to find the impulse response of a digital signal from its z-transform, such as the long division of the polynomial of z in the numerator of equation 16 by the polynomial of z in the denominator of equation 16. See J. G. Proakis and D. G. Manolakis, *Introduction to Digital Signal Processing*, McGraw-Hill, 1988. In block 128 the composite forward channel $g_{forward}(n)$ is calculated by simply performing the convolution of $f_{forward}(n)$ and $c_{forward}(n)$.

To obtain the backward impulse response or backward prefilter coefficients $f_{backward}(n)$ of the backward channel estimate, the steps denoted by blocks 124, 125, 126, 127 and 128 are repeated using $c_{backward}(n)$ defined in equation 10 instead of $c_{forward}(n)$. The corresponding steps for computing $f_{backward}(n)$ are re-labeled and denoted as blocks 129, 130, 131, 132 and 133, respectively, in FIG. 6. For example, similar to block 124, in block 129 the roots of the z-transform of the backward channel estimate $c_{backward}(n)$ are computed by:

$$C_{backward}(z) = \sum_{k=0}^{L-1} c_{backward}(n)z^{-n}. \qquad (17)$$

The signals resulting from block 128 and block 133 form part of the output of the prefilter coefficient generator 110 in FIG. 3 that is transmitted to the DFSE equalizer 114. The signals resulting from block 127 and block 132 form part of the output of the prefilter coefficient generator 110 in FIG. 3 that is transmitted to the prefilter 113.

Referring to FIG. 7, another aspect of the present invention is illustrated. It is noted that the roots of equation 17 are simply the reciprocals of the roots of equation 15. Further, only the roots of equation 15, but not those of equation 17, are computed in the process of generating both $f_{forward}(n)$ and $f_{backward}(n)$ Since the bulk of the computational complexity in the previous method lies in the blocks 124 and 129, the method illustrated in FIG. 7 effectively reduces the computational complexity of the prefilter coefficient generator 110 by a factor of two. Similar to the previous method, in block 134 the roots of the z-transform $C_{forward}(z)$ described in equation 15 are computed. The steps in blocks 135, 136, 137 and 138 are equivalent to the steps in blocks 125, 126, 127 and 128, respectively, for determining the forward impulse response $f_{forward}(n)$ and the composite forward channel $g_{forward}(n)$.

Blocks 139, 140, 141 and 142 illustrate the steps for computing the backward impulse response $f_{backward}(n)$ of the backward prefilter and the composite backward channel $g_{backward}(n)$ of the backward composite channel. In block 139, the subset $Q_{in}$ of all the roots in $$\{z_n^{forward}\}_{n=1}^{L-1}$$

which have magnitude less than or equal to one are determined. This step can be accomplished by putting the rest of the roots in $$\{z_n^{forward}\}_{n=1}^{L-1}$$

that are not in the subset $Q_{out}$ computed in block 135. In block 140, the z-transform $F_{backward}(z)$ of the backward impulse response $f_{backward}(n)$ of the backward prefilter is computed according to the following formula:

$$F_{backward}(z) = \frac{\prod_{z_i \in Q_{in}} (-z_i^* + z)}{\prod_{z_i \in Q_{in}} (1 - z_i z)}. \quad (18)$$

In block 141, the backward impulse response $f_{backward}(n)$ from the z-transform $F_{backward}(z)$ described in equation 18 is computed in the same manner as described above with respect to block 127. In block 142, the composite channel $g_{backward}(n)$ is computed by performing the convolution of $f_{backward}(n)$ and $c_{backward}(n)$. The signals resulting from block 142 form part of the output of the prefilter coefficient generator 110 in FIG. 3 that is transmitted to the DFSE equalizer 114. The signals resulting from block 141 form part of the output of the prefilter coefficient generator 110 in FIG. 3 that is transmitted to the prefilter 113. The forward impulse response of the prefilter 113 and the forward composite channel may be computed by finding the roots of the z-transform of the forward channel estimate that are greater than one and using the remaining roots to compute the backward impulse of the prefilter 113 and the backward composite channel.

Having described the invention in detail and by reference to preferred embodiments thereof, it will be apparent that modifications and variations are possible without departing from the scope of the invention defined in the appended claims.

What is claimed is:

1. A method of computing a prefilter, said method comprising:
   estimating a channel estimate of a signal received by a receiver;
   determining roots of a z-transform of said channel estimate;
   forming a z-transform of an impulse response of said prefilter based on said roots of said z-transform of said channel estimate; and
   computing prefilter coefficients of said prefilter based on said z-transform of said impulse response of said prefilter.

2. The method of claim 1, wherein estimating a channel estimate of a signal received by a receiver comprises estimating a forward channel estimate of said signal received by said receiver.

3. The method of claim 2, wherein estimating a channel estimate of a signal received by a receiver comprises estimating a backward channel estimate of said signal received by said receiver.

4. The method of claim 1, wherein forming a z-transform of an impulse response of said prefilter based on said roots of said z-transform of said channel estimate comprises finding said roots of said z-transform of said channel estimate that have a magnitude greater than one.

5. The method of claim 4, wherein forming a z-transform of an impulse response of said prefilter based on said roots of said z-transform of said channel estimate comprises finding said roots of said z-transform of said channel estimate that have a magnitude less than or equal to one.

6. The method of claim 4, wherein estimating a channel estimate of a signal received by a receiver comprises estimating a forward channel estimate of said signal received by said receiver.

7. The method of claim 4, wherein estimating a channel estimate of a signal received by a receiver comprises estimating a backward channel estimate of said signal received by said receiver.

8. The method of claim 4, wherein computing prefilter coefficients of said prefilter based on said z-transform of said impulse response of said prefilter comprises computing forward prefilter coefficients of said prefilter based on said z-transform of said impulse response of said prefilter using said roots of said z-transform of said channel estimate that have a magnitude greater than one.

9. The method of claim 5, wherein computing prefilter coefficients of said prefilter based on said z-transform of said impulse response of said prefilter comprises computing backward prefilter coefficients of said prefilter based on said z-transform of said impulse response of said prefilter using said roots of said z-transform of said channel estimate that have a magnitude less than or equal to one.

10. The method of claim 1, further comprising computing an impulse response of a composite channel based on said prefilter coefficients of said prefilter.

11. The method of claim 8, further comprising computing an impulse response of a forward composite channel based on said forward prefilter coefficients of said prefilter.

12. The method of claim 9, further comprising computing an impulse response of a backward composite channel based on said backward prefilter coefficients of said prefilter.

13. A method of computing a prefilter, said method comprising:
   estimating a forward channel estimate and a backward channel estimate of a signal received by a receiver;
   determining roots of a z-transform of said forward channel estimate;
   determining roots of a z-transform of said backward channel estimate;
   forming a z-transform of a forward impulse response of said prefilter based on said roots of said z-transform of said forward channel estimate;
   forming a z-transform of a backward impulse response of said prefilter based on said roots of said z-transform of said backward channel estimate;
   computing forward prefilter coefficients of said prefilter based on said z-transform of said forward impulse response of said prefilter; and
   computing backward prefilter coefficients of said prefilter based on said z-transform of said backward impulse response of said prefilter.

14. The method of claim 13, wherein forming a z-transform of a forward impulse response of said prefilter based on said roots of said z-transform of said forward channel estimate comprises finding said roots of said z-transform of said forward channel estimate that have a magnitude greater than one.

15. The method of claim 14, wherein forming a z-transform of a backward impulse response of said prefilter based on said roots of said z-transform of said backward channel estimate comprises finding said roots of said z-transform of said backward channel estimate that have a magnitude greater than one.

16. The method of claim 13, further comprising computing an impulse response of a forward composite channel based on said forward prefilter coefficients of said prefilter.

17. The method of claim 16, further comprising computing an impulse response of a backward composite channel based on said backward prefilter coefficients of said prefilter.

18. A method of computing a prefilter, said method comprising:
   estimating a channel estimate of a signal received by a receiver;
   determining roots of a z-transform of said channel estimate;

forming a z-transform of a forward impulse response of said prefilter based on said roots of said z-transform of said channel estimate having a magnitude greater than one;

forming a z-transform of a backward impulse response of said prefilter based on said roots of said z-transform of said channel estimate having a magnitude less than or equal to one;

computing forward prefilter coefficients of said prefilter based on said z-transform of said forward impulse response of said prefilter; and computing backward prefilter coefficients of said prefilter based on said z-transform of said backward impulse response of said prefilter.

19. The method of claim 18, wherein estimating a channel estimate of a signal received by a receiver comprises estimating a forward channel estimate of said signal received by said receiver.

20. The method of claim 18, further comprising computing an impulse response of a forward composite channel based on said forward prefilter coefficients of said prefilter.

21. The method of claim 18, further comprising computing an impulse response of a backward composite channel based on said backward prefilter coefficients of said prefilter.

22. A baseband processor comprising:
a channel estimator estimating a channel estimate of a received signal;
a prefilter coefficient generator generating prefilter coefficients in response to said channel estimate received from said channel estimator; and
a prefilter filtering said received signal based on said prefilter coefficients generated by said prefilter coefficient generator;
wherein said prefilter coefficient generator determines roots of a z-transform of said channel estimate, forms a z-transform of an impulse response of said prefilter based on said roots of said z-transform of said channel estimate, and computes said prefilter coefficients of said prefilter based on said z-transform of said impulse response of said prefilter.

23. The baseband processor of claim 22, further comprising a synchronizer that determines positions of data symbols contained within said received signal, said synchronizer outputting a burst representative of said data symbols to said prefilter, said prefilter filtering said burst based on said prefilter coefficients generated by said prefilter coefficient generator.

24. The baseband processor of claim 23, wherein said channel estimate comprises a forward channel estimate.

25. The baseband processor of claim 24, wherein said channel estimate comprises a backward channel estimate.

26. The baseband processor of claim 22, wherein said prefilter coefficient generator finds said roots of said z-transform of said channel estimate that have a magnitude greater than one.

27. The baseband processor of claim 26, wherein said prefilter coefficient generator finds said roots of said z-transform of said channel estimate that have a magnitude less than or equal to one.

28. The baseband processor of claim 26, wherein said channel estimate comprises a forward channel estimate.

29. The baseband processor of claim 26, wherein said channel estimate comprises a backward channel estimate.

30. The baseband processor of claim 26, wherein said prefilter coefficient generator computes forward prefilter coefficients of said prefilter based on said z-transform of said impulse response of said prefilter using said roots of said z-transform of said channel estimate that have a magnitude greater than one.

31. The baseband processor of claim 27, wherein said prefilter coefficient generator computes forward prefilter coefficients of said prefilter based on said z-transform of said impulse response of said prefilter using said roots of said z-transform of said channel estimate that have a magnitude less than or equal to one.

32. The baseband processor of claim 22, wherein said prefilter coefficient generator computes an impulse response of a composite channel based on said prefilter coefficients of said prefilter and further comprising a DFSE that detects data symbols within said received signal filtered by said prefilter in response to impulse response of said composite channel.

33. The baseband processor of claim 30, wherein said prefilter coefficient generator computes an impulse response of a forward composite channel based on said forward prefilter coefficients of said prefilter, and wherein said baseband processor further comprises a DFSE equalizer that detects data symbols within said received signal filtered by said prefilter in response to said impulse response of said forward composite channel.

34. The baseband processor of claim 31, wherein said prefilter coefficient generator computes an impulse response of a backward composite channel based on said forward prefilter coefficients of said prefilter, and wherein said baseband processor further comprises a DFSE equalizer that detects data symbols within said received signal filtered by said prefilter in response to said impulse response of said backward composite channel.

35. A baseband processor comprising:
a channel estimator estimating a forward channel estimate and a backward channel estimate of a received signal;
a prefilter coefficient generator generating forward prefilter coefficients and backward prefilter coefficients in response to said channel estimate received from said channel estimator; and
a prefilter filtering said received signal based on said prefilter coefficients generated by said prefilter coefficient generator;
wherein said prefilter coefficient generator determines roots of a z-transform of said forward channel estimate, determines roots of a z-transform of said backward channel estimate, forms a z-transform of a forward impulse response of said prefilter based on said roots of said z-transform of said forward channel estimate, forms a z-transform of a backward impulse response of said prefilter based on said roots of said z-transform of said backward channel estimate, computes said forward prefilter coefficients of said prefilter based on said z-transform of said forward impulse response of said prefilter, and computes said backward prefilter coefficients of said prefilter based on said z-transform of said backward impulse response of said prefilter.

36. The baseband processor of claim 35, further comprising a synchronizer that determines positions of data symbols contained within said received signal, said synchronizer outputting a burst representative of said data symbols to said prefilter, said prefilter filtering said burst based on said forward prefilter coefficients and said backward prefilter coefficients generated by said prefilter coefficient generator.

37. The baseband processor of claim 35, wherein said prefilter coefficient generator computes said forward prefilter coefficients of said prefilter based on said z-transform of said forward impulse response of said prefilter using said roots of said z-transform of said forward channel estimate that have a magnitude greater than one.

38. The baseband processor of claim 36, wherein said prefilter coefficient generator computes said backward prefilter coefficients of said prefilter based on said z-transform of said backward impulse response of said prefilter using said roots of said z-transform of said backward channel estimate that have a magnitude greater than one.

39. The baseband processor of claim 37, wherein said prefilter coefficient generator computes an impulse response of a forward composite channel based on said forward prefilter coefficients of said prefilter, and wherein said baseband processor further comprises a DFSE equalizer that detects data symbols within said received signal filtered by said prefilter in response to said impulse response of said forward composite channel.

40. The baseband processor of claim 39, wherein said prefilter coefficient generator computes an impulse response of a backward composite channel based on said backward prefilter coefficients of said prefilter, and wherein said baseband processor further comprises a DFSE equalizer that detects data symbols within said received signal filtered by said prefilter in response to said impulse response of said backward composite channel.

41. A baseband processor comprising:
   a channel estimator estimating a channel estimate of a received signal;
   a prefilter coefficient generator generating forward prefilter coefficients and backward prefilter coefficients in response to said channel estimate received from said channel estimator; and
   a prefilter filtering said received signal based on said prefilter coefficients generated by said prefilter coefficient generator;
   wherein said prefilter coefficient generator determines roots of a z-transform of said channel estimate, forms a z-transform of a forward impulse response of said prefilter based on said roots of said z-transform of said channel estimate having a magnitude greater than one, forms a z-transform of a backward impulse response of said prefilter based on said roots of said z-transform of said channel estimate having a magnitude less than or equal to one, computes said forward prefilter coefficients of said prefilter based on said z-transform of said forward impulse response of said prefilter, and computes said backward prefilter coefficients of said prefilter based on said z-transform of said backward impulse response of said prefilter.

42. The baseband processor of claim 41, further comprising a synchronizer that determines positions of data symbols contained within said received signal, said synchronizer outputting a burst representative of said data symbols to said prefilter, said prefilter filtering said burst based on said forward prefilter coefficients and said backward prefilter coefficients generated by said prefilter coefficient generator.

43. The baseband processor of claim 41, wherein said channel estimate is a forward channel estimate.

44. The baseband processor of claim 41, wherein said prefilter coefficient generator computes an impulse response of a forward composite channel based on said forward prefilter coefficients of said prefilter, and wherein said baseband processor further comprises a DFSE equalizer that detects data symbols within said received signal filtered by said prefilter in response to said impulse response of said forward composite channel.

45. The baseband processor of claim 41, wherein said prefilter coefficient generator computes an impulse response of a backward composite channel based on said backward prefilter coefficients of said prefilter, and wherein said baseband processor further comprises a DFSE equalizer that detects data symbols within said received signal filtered by said prefilter in response to said impulse response of said backward composite channel.

46. The method of claim 1, further comprising computing an impulse response of a composite channel by performing a convolution of the impulse response of the prefilter and the channel estimate.

47. The method of claim 1, further comprising computing an impulse response of a forward composite channel by performing a convolution of an impulse response of a forward prefilter and a forward channel estimate.

48. The method of claim 1, further comprising computing an impulse response of a backward composite channel by performing a convolution of an impulse response of a backward prefilter and a backward channel estimate.

49. The baseband processor of claim 22, wherein the prefilter coefficient generator computes an impulse response of a composite channel by performing a convolution of the impulse response of the prefilter and the channel estimate of the received signal.

* * * * *

UNITED STATES PATENT AND TRADEMARK OFFICE
CERTIFICATE OF CORRECTION

PATENT NO.     : 6,608,862 B1
DATED          : August 19, 2003
INVENTOR(S)    : Zangi, Kambiz C.

It is certified that error appears in the above-identified patent and that said Letters Patent is hereby corrected as shown below:

Column 15,
Line 9, replace "claim 37" with -- claim 35 --.

Signed and Sealed this

Sixteenth Day of December, 2003

JAMES E. ROGAN
*Director of the United States Patent and Trademark Office*